United States Patent [19] [11] Patent Number: 4,743,184
Sumikawa et al. [45] Date of Patent: May 10, 1988

[54] ROTARY COMPRESSOR WITH HEATING PASSAGE BETWEEN DISCHARGE CHAMBER AND SHAFT SEAL

[75] Inventors: Seiji Sumikawa; Haruhiko Takada, both of Saitama; Mikio Tanino, Hatano; Kazuhiro Irie, Yokohama, all of Japan

[73] Assignees: Nissan Motor Co., Ltd.; Diesel Kiki Co., Ltd., both of Japan

[21] Appl. No.: 938,435

[22] Filed: Dec. 5, 1986

[30] Foreign Application Priority Data

Dec. 6, 1985 [JP] Japan .................................. 60-274608

[51] Int. Cl.⁴ .................... F04C 18/344; F04C 29/04; F04C 29/02
[52] U.S. Cl. ....................................... 418/84; 418/87; 418/100; 418/104
[58] Field of Search ....................... 418/84, 87, 93, 98, 418/100, 102, 104; 184/6.16

[56] References Cited

FOREIGN PATENT DOCUMENTS 57-212391 12/1982 Japan ..................................... 418/98
59-115490 7/1984 Japan .
60-98187 6/1985 Japan .
1386836 3/1975 United Kingdom .................. 418/98

Primary Examiner—John J. Vrablik
Attorney, Agent, or Firm—Leydig, Voit & Mayer

[57] ABSTRACT

A rotary compressor features a passage structure and valve arrangement which, under given modes of operation, permits relatively hot gaseous compressed working fluid to be introduced into a chamber proximate a bearing which is subject to cooling and the lubricant therein subject to dilution by working fluid under such conditions, in a manner to warm the bearing and its immediate surroundings and obviate the dilution problem.

9 Claims, 4 Drawing Sheets

ROTARY COMPRESSOR WITH HEATING PASSAGE BETWEEN DISCHARGE CHAMBER AND SHAFT SEAL

BACKGROUND OF THE INVENTION

1. Field of the Invention

The present invention relates generally to a rotary type compressor for an air-conditioning unit or the like and more specifically to a rotary compressor which includes a passage structure which enables the temperature of the bearings which rotatably support the drive shaft of the compressor to be maintained at a desirable level and prevent undesirable dilution of the lubricant therein.

2. Description of the Prior Art

In a previously proposed compressor arrangement disclosed in Japanese Patent Application First Provisional Publication No. 59-115490 the drive shaft of the compressor has been journalled in needle bearings or the like to reduce frictional losses. However, in the instance that such a compressor is used in the cooling circuit of an air-conditioner unit which uses a fluorocarbon refrigerant as the working fluid, during low thermal load operating conditions wherein the compressor is permitted to idle for relatively long periods, the needle bearing closest to the induction port of the device tends to be subjected to low temperature, high pressure conditions (e.g. 35 $-36°$ C. 8Atm) wherein the working fluid tends to mix with and dilute the oil (eg napthene class of lubricant) which lubricates the bearing in question. This phenomenon as shown in FIG. 5 has a detremental effect on the viscosity of the lubricant. Viz., as the amount of refrigerant (wt %) increases the kinematic viscosity of the oil (centistoke) rapidly drops.

Thus, in order to ensure that required characteristics of the lubricant are maintained in a manner which ensures the longevity of the bearing in question it is necessary to minimize the amount of dilution which occurs.

In order to overcome this problem it has been proposed in Japanese Patent Application First Provisonal Publication No. 60-98197 published on June 1, 1960 to provided a passage which leads from a chamber proximate the inboard end of the pump drive shaft and the needle bearing located distal from the induction port of the device, to a zone exposed to the high temperature high pressure pump discharge. A trigger valve is disposed in this pasage and arranged to close upon a predetermined discharge pressure being reached.

However, as this chamber communicates with the needle bearing proximate the inlet port of the pump via the vane reaction pressure chambers formed in the rotor, it has proven difficult to adequately maintain the temperature and pressure in and around the "induction side" bearing.

SUMMARY OF THE INVENTION

It is an object of the present invention to provide a rotary compressor which includes a passage structure which enables the temperature and pressure prevailing in close proximity of the bearing closest to the inlet port of the pump to be kept at levels which obivate the tendency for the bearing lubricant to be become undesirably diluted.

In brief, the above object is achieved by an arrangement wherein a passage structure and valve arrangement, under given modes of operation, permits relatively hot gaseous compressed working fluid to be introduced into a chamber proximate a bearing which is subject to cooling and the lubricant therein subject to dilution by working fluid under such conditions, in a manner to warm the bearing and its immediate surroundings and reduce the amount of dilution.

More specifically, the present invention takes the form of a rotary compressor which includes a drive shaft; a rotor operatively mounted on the drive shaft, the rotor including a plurality of vanes operatively disposed therewith; a cam ring disposed about the rotor in a manner which operatively cooperates with the vanes; first and second end members disposed with the cam ring in a manner which enclose the rotor in the cam ring; means defining an induction chamber, the induction chamber being located proximate the first end member and fluidly communicated with the interior of the cam ring via a induction port formed in the first end member; means defining a discharge chamber which fluidly communicates with the interior of the cam ring via an exhaust port; a first bearing for rotatably supporting the drive shaft, the first bearing being disposed in the first end member; a second bearing for rotatably supporting the drive shaft, the second bearing being disposed in the second end member; a seal disposed about the drive shaft; the seal defining a seal chamber between it and the first end member, the seal chamber being located proximate the first bearing; and means defining a passage structure in the first end member which leads from the discharge chamber to the seal chamber.

DETAILED DESCRIPTION OF THE PREFERRED EMBODIMENTS

Figure 1:
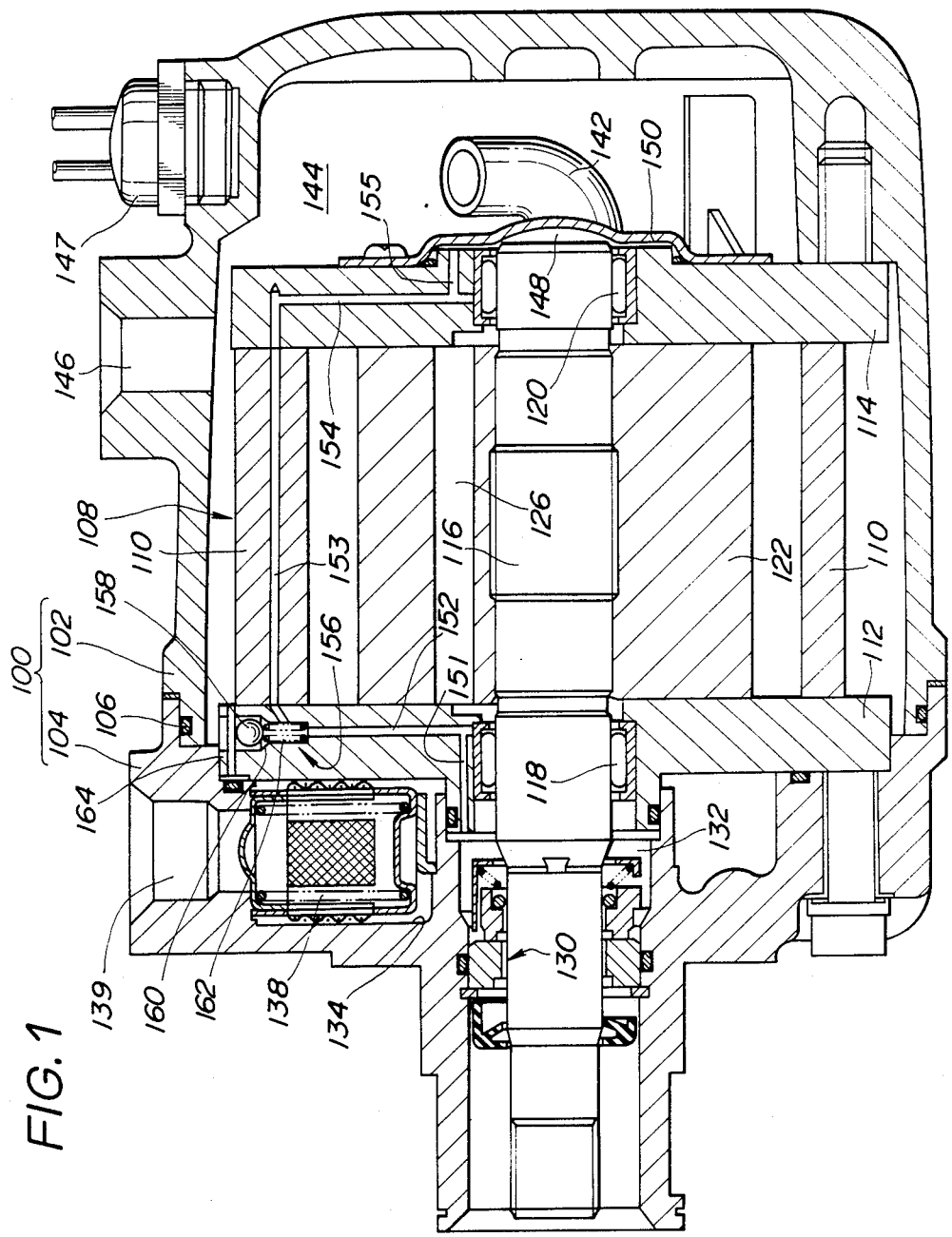
FIG. 1 shows a first embodiment of the present invention.

FIG. 1 shows a first embodiment of the present invention. In this arrangement a casing 100 comprises a main body 102 and a detachable front head 104. An O ring 106 is used to hermetically seal the joint therebetween. Enclosed within the casing is a compressor unit 108. As shown, this unit is comprised of a cam ring 110 and front and rear side block members 112, 114. The latter mentioned members are sealingly disposed against the ends of the cam ring 110 in manner to define a closed compression chamber.

A drive shaft 116 is disposed through the front side and rear side blocks 112, 114 and journalled in needle bearings 118, 120 mounted therein.

Figure 3:
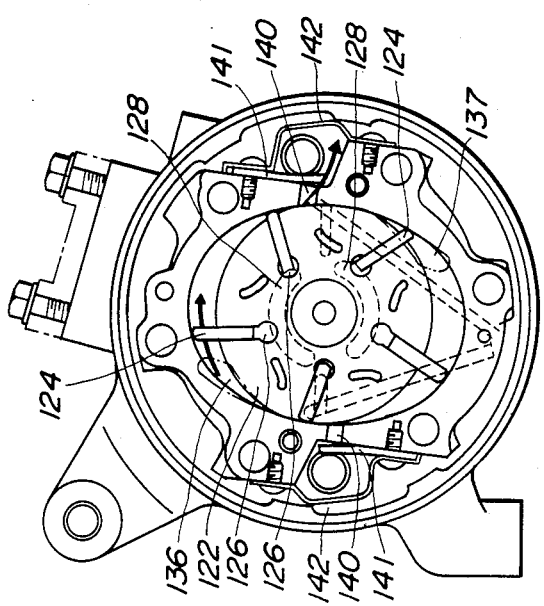
Figure 5:
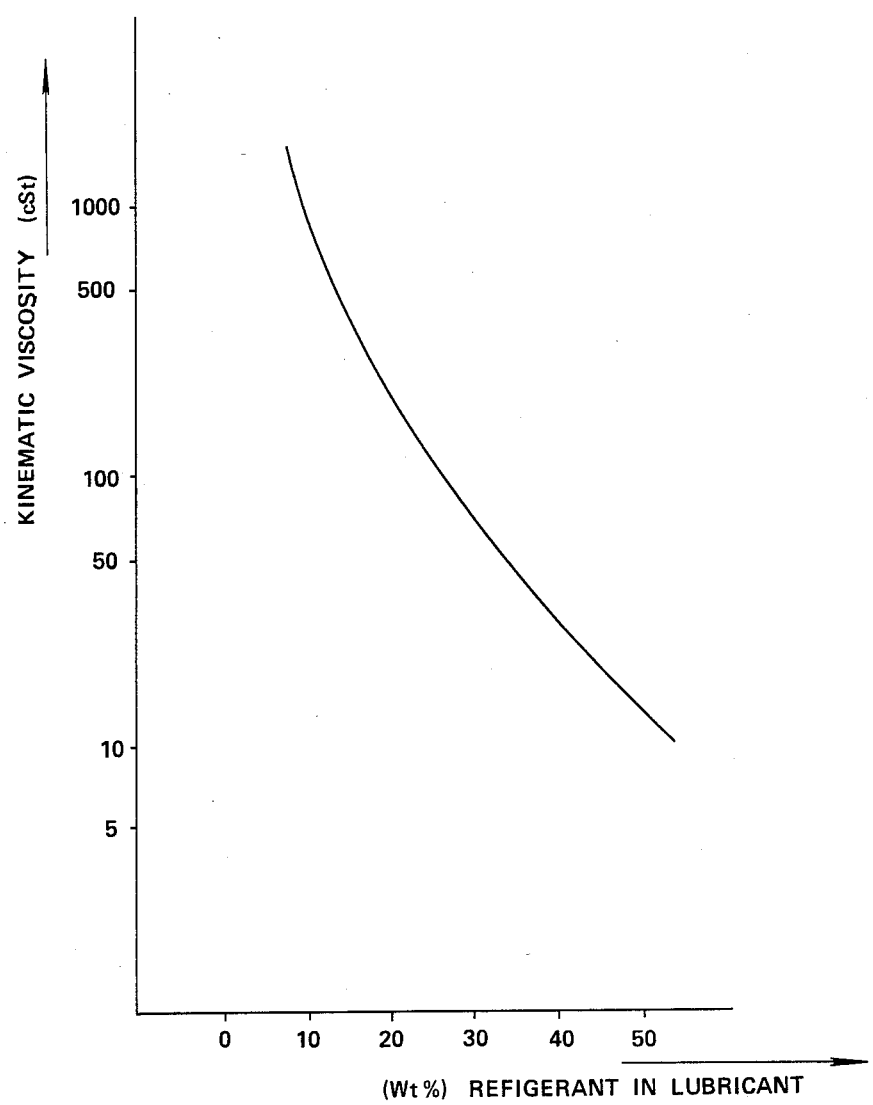
FIG. 5 is a graph showing in terms of kinematic viscosity and percent (wt) of fluorocarbon refrigerant contained in the lubricant, the effect produced by the dilution which occurs in the prior art discussed in the opening paragraphs of the present invention.

A rotor 122 is disposed within the chamber and operatively connected to the drive shaft 116 for synchonrous rotation therewith. As best seen in FIG. 3 this rotor 122 includes a plurality of radially extending slots in which vanes 124 are reciprocatively disposed. The radially inboard ends of the slots are arranged to defined reaction chambers 126 which when pressurized function to bias the vanes 124 outwardly and into contact with the inner wall the cam ring 110.

The inner walls of the front and rear side blocks 112, 114 are formed with arcuate recesses 128 (see FIG. 3) which are arranged to provide fluid communication between the reaction chambers 126 and facilitate the pressurization of the same when the compressor is in operation.

A seal member 130 including two O rings is disposed in a bore formed in the front head 104 and about the outboard end of the drive shaft 116 in a manner which seals off the interior of the compressor and defines a seal chamber 132 within the bore.

An induction chamber 134 is formed in the front heat 104 and fluidly communicated with the interior of the cam ring 110 via first and second induction ports 136, 137 (see FIG. 3) formed in the front side block 112. This chamber is discrete from the seal chamber 132.

A strainer 138 is disposed in the induction chamber 134 to filter out any foreign particles or the like which might be induced into the compressor via the intake port 139. This port in the instant arrangement is fluidly communicated with an evaporator of an air conditioner unit.

Exhaust ports 140 are formed through the wall of the cam ring and controlled by reed valves 141. During operation of the compressor the compressed refrigerant gas which is discharged through the exhaust ports 140 is released via spout like members 142 secured to the side of the cam ring 110, into an exhaust chamber 144 defined within the casing 100 and about the compressor unit (viz., the cam ring 110 and rear side block 114).

The compressed gas is transferred from the compressor to a suitable heat exchanger for cooling prior expansion, via a discharge port 146 formed in the main body 102.

A pressure sensor 147 or the like device is disposed in the main body in a manner to be responsive to the conditions prevailing in chamber. The output of this sensor is used in conjunction with other control circuitry (not shown) to control an electromagnetic clutch or the like device which establishes a drive connection between the drive shaft and a prime mover such as an automotive internal combustion engine.

The cam ring 110, front and rear side blocks 112, 114 are formed with a passage structure which interconnects the seal chamber 132, bearing 118, chamber 144, bearing 120, and a chamber 148 defined proximate the inboard end of the drive shaft 116 by a cover member 150 secured to the outer face of the rear side block 114. In this embodiment the passage structure takes the form of a plurality of straight bores 151, 152, 153, 154 and 155 formed in the above mentioned components which define the compressor unit 108. A trigger valve 156 is arranged to control communication between the exhaust chamber 144 and the passage structure. This valve as shown, comprises a spherical valve element 158, a valve seat in the form of a conical chamfer 160, a spring 162 which is disposed in a slightly enlarged diameter bore section of the passage structure and which biases the valve element 158 toward an open position, and a retainer or stopper 164 secured to the upper section of the front side block 112 which prevents the valve element 158 from undergoing excessive movement.

When the thermal load on the air conditioner unit is high the relatively high temperature and pressure conditions which prevail within the compressor obviate any tendency for the lubricant in and around either of the needle bearings 118, 120 to undergo any dilution with the working fluid of the system. Thus, at this time it is possible to close the trigger valve 156 and cut-off any communication between the passage structure and exhaust chamber 144. In order to achieve this spring 162 is selected to have a spring constant which is overcome by the discharge pressure developed at this time.

Upon entering low thermal load operation the discharge pressure of the compressor lowers to a level at which valve spring 162 moves the valve element 158 to an open position and establishes fluid communication between exhaust chamber 144 and the passage structure. Accordingly, at this time the high temperature gas contained in exhaust chamber 144 is permitted to enter the passage structure. Accordingly, the temperature and pressure conditions in the seal chamber 132 are maintained at a desirably high level and enables sufficient heat to be imparted to the structure in the immediate vicinity of the seal chamber 132 to offset the cooling phenomenon encountered with the prior art. Further, as the pressure in the reaction chambers 126 is lower than that prevailing in the seal chamber 132 the high temperature gaseous working fluid tends to flow from the seal chamber 132 to the reaction chambers 126. This ensures that sufficient heat is imparted to the needle bearing 118 and its surroundings to keep the temperature of the same high enough to obviate any tendancy for the lubricant of the bearing to undergo any undesirable dilution.

While maintaining the temperature and pressure prevailing in the seal chamber as described above, alone is sufficient to obviate the problem encountered with the prior art it is also within the scope of the present invention to additionally heat bearing 120 in a similar manner. Hence passages 153–155 in the cam ring 110 and rear side block 114 are provided.

It will be noted that with the first embodiment of the present invention as there is no passage structure formed in the drive shaft 116 (in particular no radial bores) the strength thereof is not reduced and therefor permits the minimium diameter for any given shaft strength requirement.

It will also be noted that although the passages 151, 152 which leads from the trigger valve 156 to the seal chamber 132 is relatively remote from the discharge port 146 the relative shortness of the same prevents any detremental temperature loss between exhaust chamber 144 and the seal chamber 132.

Figure 2:
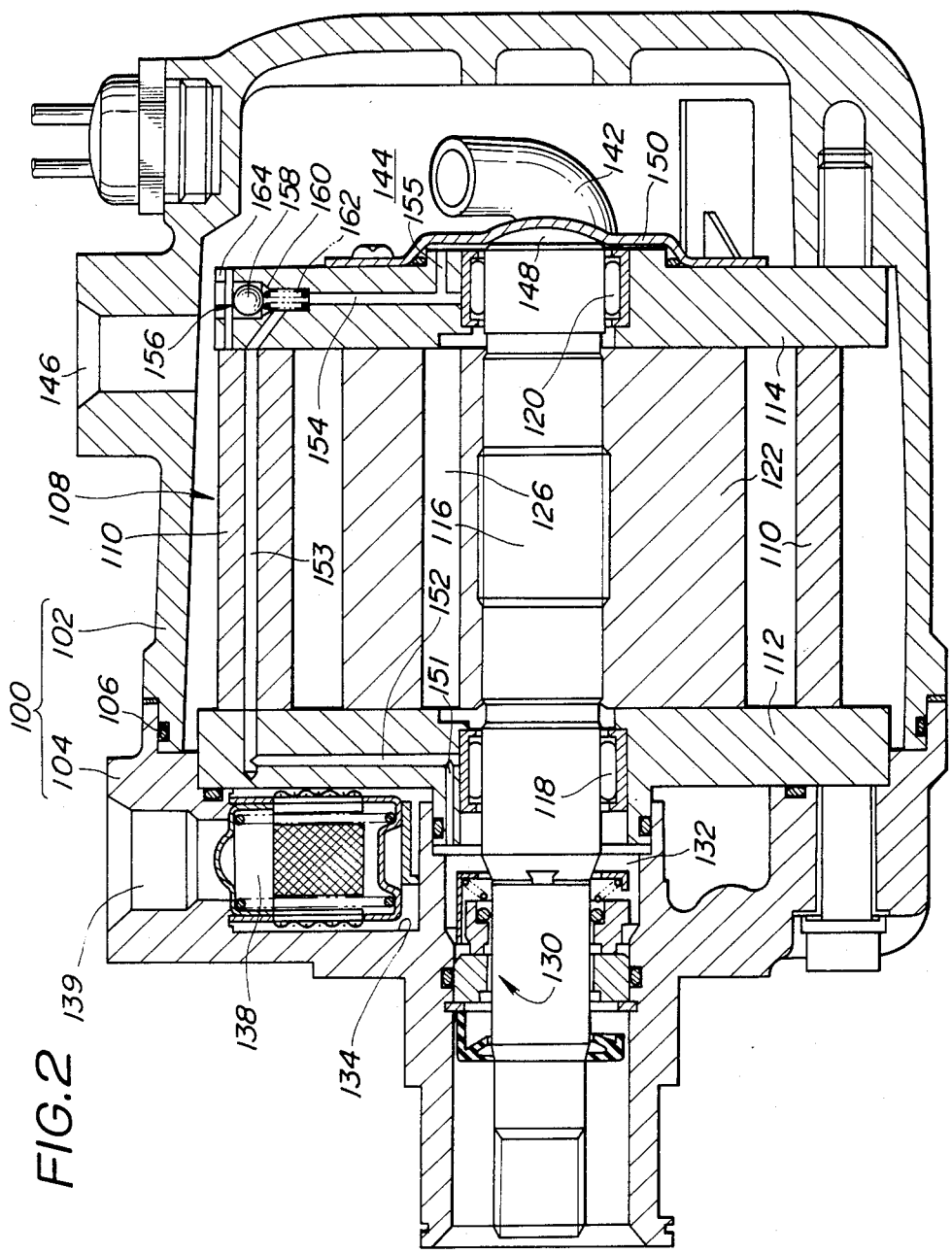
FIG. 2 to 4 show a second embodiment of the present invention.
Figure 4:
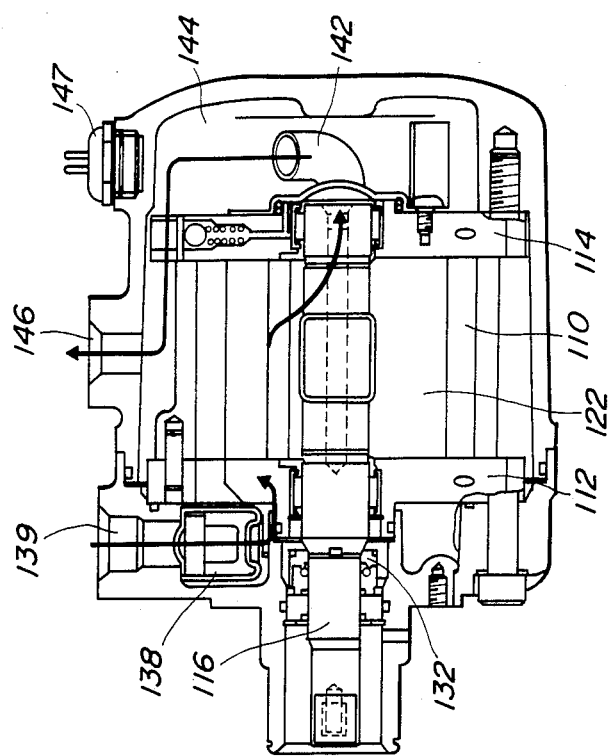

FIGS. 2 to 4 show a second embodiment of the present invention. In this embodiment the trigger valve is disposed in the rear side block. However, as the valve 156 is located close to the discharge port 146 the length of the passage structure which leads from the trigger valve to the seal chamber 132 is offset by the elevated temperatures which inherently tend to prevail at the discharge port 146.

With this embodiment also it is possible to eliminate any passage structure in the drive shaft in a manner which enables the maximum structural strengh of the same to be realized.

Further, with the embodiments of the invention it is not necessary to provide more than one trigger valve. This enables the number of moving parts of the device to be minimized.

What is claimed is:
1. In a rotary compressor
   a drive shaft;
   a rotor operatively mounted on said drive shaft, said rotor including a plurality of vanes operatively disposed therewith;

a cam ring disposed about said rotor in a manner which operatively cooperates with said vanes;

first and second end members disposed with said cam ring in a manner which enclose said rotor in said cam ring;

means defining an induction port in said first end member and an induction chamber proximate said first end member and fluidly communicated with the interior of said cam ring via said induction port;

means defining an exhaust chamber and an exhaust port, said exhaust chamber being in fluid communication with the interior of said cam ring via said exhaust port;

a first bearing for rotatably supporting said drive shaft, said first bearing being disposed in said first end member;

a second bearing for rotatably supporting said drive shaft, said bearing being disposed in said second end member;

a seal disposed about said drive shaft, said seal defining a seal chamber between said seal and said first end member, said seal chamber being located proximate said first bearing; and means for transferring hot compressed coolant vapor from said exhaust chamber to said seal chamber, said transferring means comprising:

a passage structure which leads from said exhaust chamber and opens into said seal chamber, said passage structure providing fluid communication between said seal chamber and said exhaust chamber; and a valve which controls the fluid communication between said seal chamber and said exhaust chamber, said valve being arranged to cut off fluid communication between said seal chamber and said exhaust chamber when the pressure in said exhaust chamber exceeds a predetermined level.

2. A rotary compressor as claimed in claim 1 wherein said passage structure includes:

a first passage formed in said first end member, said first passage including a stepped bore section formed in the upstream end thereof, and wherein said valve is disposed in said stepped bore section.

3. A rotary compressor as claimed in claim 2 wherein said passage structure further comprises:

a second passage which is formed in said second end member; and a third passage which leads through said cam ring and which fluidly interconnects said first and second passages.

4. A rotary compressor as claimed in claim 1 wherein said passage structure includes:

a first passage formed in said second end member, said first passage including a stepped bore section formed in the upstream end thereof, and wherein said valve is disposed in said stepped bore section.

5. A rotary compressor as claimed in claim 4 wherein said passage structure further comprises:

a second passage which is formed in said first end member; and a third passage which leads through said cam ring and which fluidly interconnects said first and second passages.

6. A rotary compressor as claimed in claim 1, wherein said passage structure communicates with said seal chamber at a single point of communication located proximate a discharge port via which compressed gas in said exhaust chamber is vented therefrom.

7. A rotary compressor as claimed in claim 6, wherein said single point of communication is located in said second end member.

8. A rotary compressor as claimed in claim 1, wherein said passage structure communicates with said seal chamber at a single point of communication located in said first end member and distal from a discharge port via which compressed gas in said exhaust chamber is vented therefrom.

9. In a rotary compressor a drive shaft;

a rotor operatively mounted on said drive shaft, said rotor including a plurality of vanes operatively disposed therewith;

a cam ring disposed about said rotor in a manner which operatively cooperates with said vanes;

first and second end members disposed with said cam ring in a manner which enclose said rotor in said cam ring;

means defining an induction port in said first end member and an induction chamber proximate first end member and fluidly communicated with the interior of said cam ring via said induction port;

means defining an exhaust chamber and an exhaust port, said exhaust chamber being in fluid communication with the interior of said cam ring via said exhaust port;

a first bearing for rotatably supporting said drive shaft, said first bearing being disposed in said first end member;

a second bearing for rotatably supporting said drive shaft, said second bearing being disposed in said second end member;

a seal disposed about said drive shaft, said seal defining a seal chamber between said seal and said first end member, said seal chamber being located proximate said first bearing; and first bearing temperature control means for transferring hot compressed coolant vapor from said exhaust chamber to said chamber and warming said first bearing, said first bearing temperature control means comprising:

a passage structure defined in one of said first and second end members which leads from said exhaust chamber and opens into said seal chamber; and second bearing temperature control means for warming said second bearing, said second bearing temperature control means comprising:

means defining a chamber proximate said second end member and said second bearing; and interconnected passages formed in said cam ring and the other of said first and second end members in a manner to fluidly interconnect said seal chamber with said chamber formed proximate said second end member and said second bearing.

* * * * *